April 22, 1952     A. E. KNESS     2,594,182
ANIMAL TRAP

Filed April 22, 1948     3 Sheets-Sheet 1

Austin E. Kness
INVENTOR.

April 22, 1952     A. E. KNESS     2,594,182
ANIMAL TRAP
Filed April 22, 1948     3 Sheets-Sheet 2
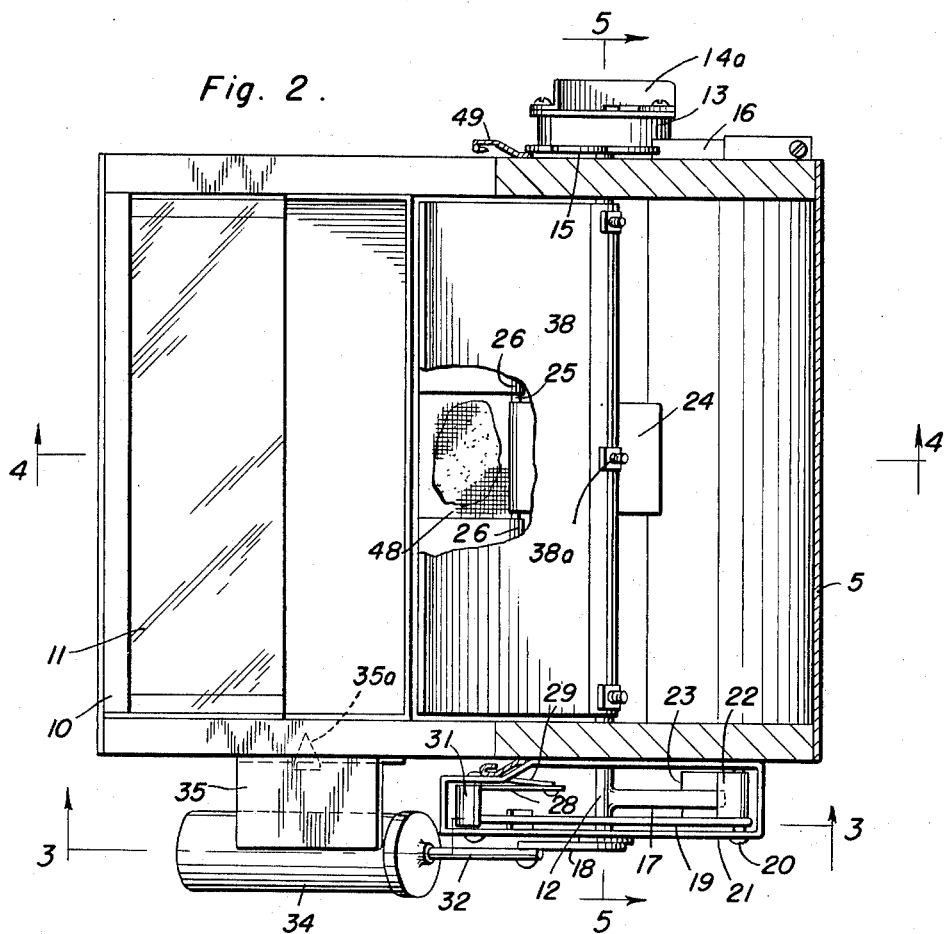
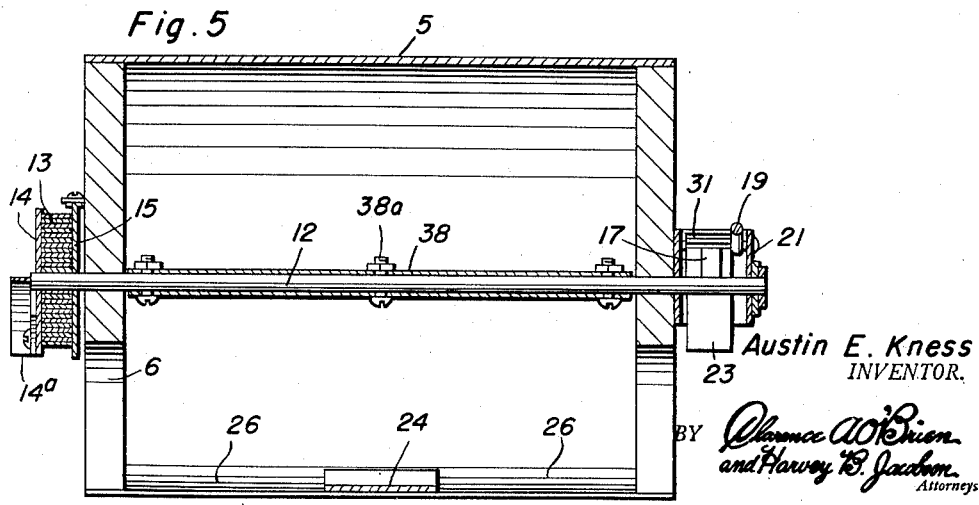
Austin E. Kness
INVENTOR.

April 22, 1952 A. E. KNESS 2,594,182
ANIMAL TRAP
Filed April 22, 1948 3 Sheets-Sheet 3

Austin E. Kness
INVENTOR.

BY
Attorneys

Patented Apr. 22, 1952

2,594,182

UNITED STATES PATENT OFFICE 2,594,182

ANIMAL TRAP

Austin E. Kness, Albia, Iowa

Application April 22, 1948, Serial No. 22,660

4 Claims. (Cl. 43—74)

The present invention relates to new and useful improvements in animal traps and more particularly to a trap of the "self-set" or "ever-set" type.

An important object of the invention is to provide a spring actuated rotating fin working in a cage to engage and carry an animal into a position for depositing into a water tank whereby to catch a large number of animals without requiring replenishing of the bait.

A further object of the invention is to provide animal actuated trip means for the rotating fin to set the trap in motion and to provide automatic resetting means for the trip mechanism.

Another object of the invention is to provide scraping means for effectively removing the animal from the fin as the animal is carried thereby to the water tank.

A still further object is to provide a dash-pot mechanism for controlling the speed of the rotating fin as the same approaches its resetting position to thus avoid damage to the fin and trip mechanism.

A still further object is to provide an animal trip of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a horizontal sectional view of the trap drum taken substantially on a line 2—2 of Figure 1;

Figure 5 is a longitudinal sectional view of the drum taken substantially on a line 5—5 of Figure 2;

Figure 1:
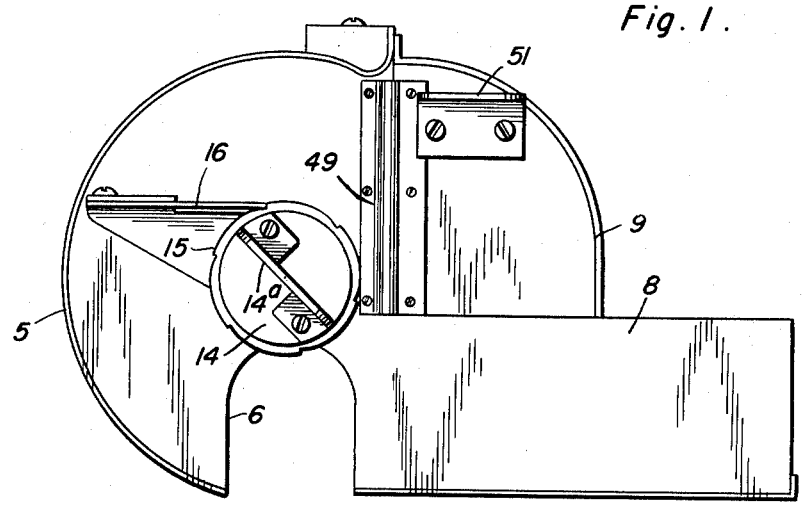
Figure 1 is a side elevational view.
Figure 6:
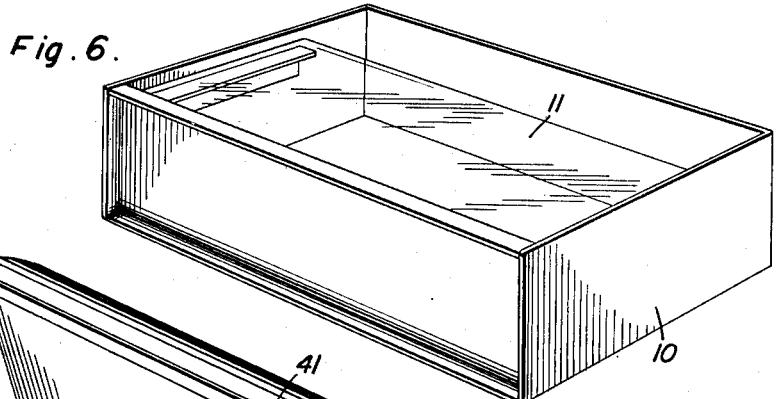
Figure 6 is an enlarged perspective view of the water tank.
Figure 7:
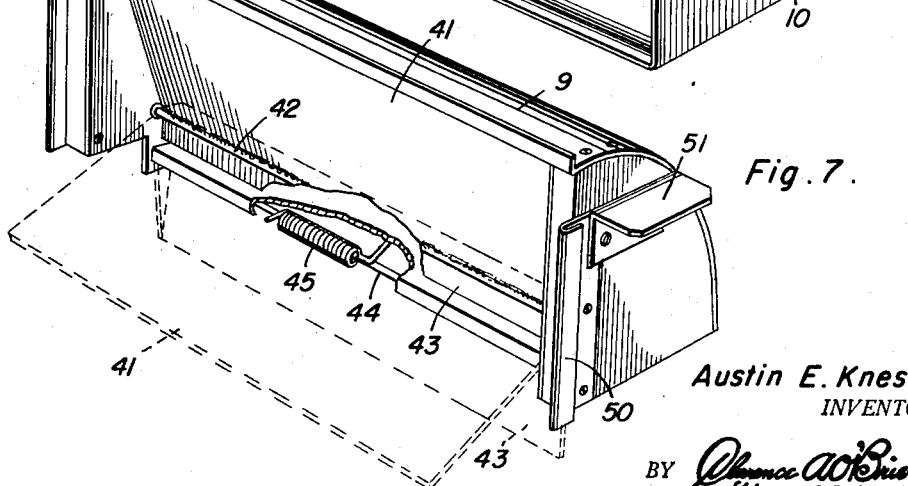
Figure 7 is a similar view of the animal removing scraper for the rotary fin.
Figure 3:
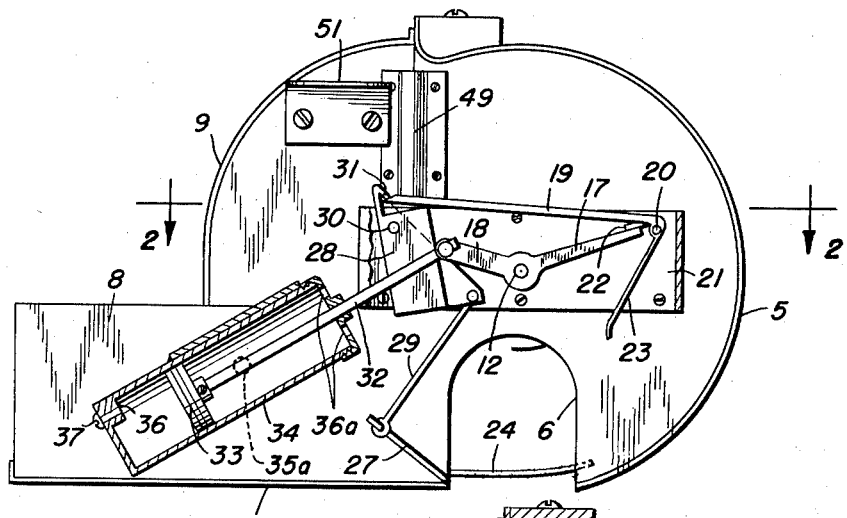
Figure 3 is a vertical sectional view taken substantially on a line 3—3 of Figure 2 and showing the trip and dash-pot mechanisms.

Referring now to the drawings in detail wherein for the purpose of illustration I have disclosed a preferred embodiment of the invention the numeral 5 designates a horizontally positioned drum-like housing having an animal entrance 6 at each end of the lower portion thereof. A base 7 extends from one side of the housing 5 and is formed with side walls 8 integrally formed with the ends of the housing.

The side of the housing 5 adjacent the base 7 is provided with a removable curved cover 9 having its lower edge partly overlying a water tank 10 supported on the base. The outer portion of the water tank beyond the cover 9 is provided with a glass or other transparent top 11.

Figure 4:
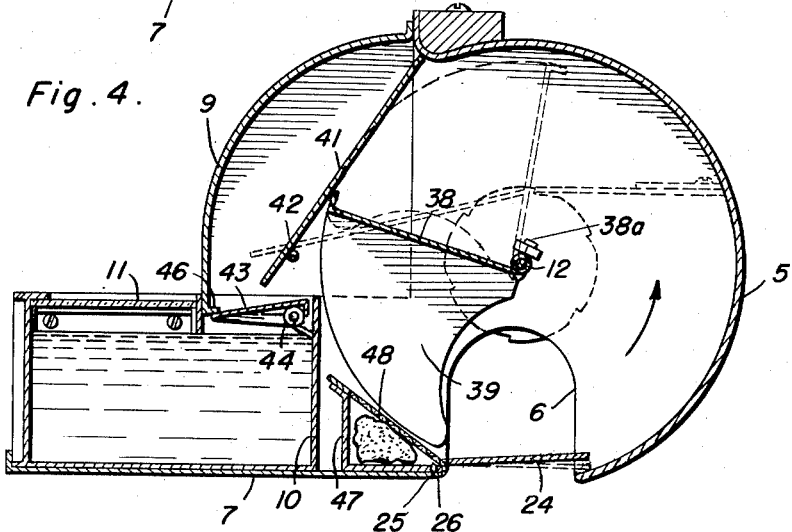
Figure 4 is a transverse sectional view taken substantially on a line 4—4 of Figure 2.
Figure 8:
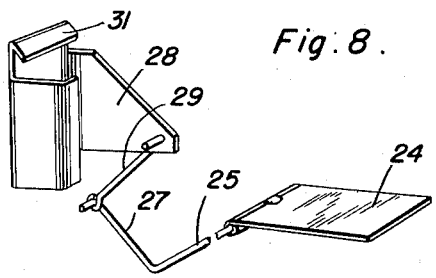
Figure 8 is an enlarged perspective view of the animal operated treadle and trigger for releasing the trip.

A shaft 12 is journalled in the ends of the housing 5 above the entrance openings 6, one end of the shaft having one end of a spring 13 attached thereto for rotating the shaft in a direction as shown by the arrow in Figure 4 of the drawings. The other end of spring 13 is attached to a winding spool 14 which includes a winding key 14a and a ratchet 15 on one edge of the spool engaged by a resilient pivoted dog 16 to hold the spring while being wound by the key.

An arm 17 extends radially from the other end of shaft 12 and a second arm 18 also extends radially from the shaft in a direction substantially opposite from that of arm 17. A trip arm 19 is pivoted at one end on a pin 20 carried by a bracket 21 at the end of housing 5 adjacent arms 17 and 18, the trip arm being provided at its pivoted end with a catch 22 engaging the outer end of arm 17. A resetting finger 23 is also provided for trip arm 19 at its pivoted end.

An animal operated trip treadle 24 is secured at one end to a shaft 25 which is journalled in a bearing 26 on the edge of base 7 adjacent the entrance openings 6. An upwardly inclined arm 27 extends from shaft 25 and is connected to one corner of a substantially triangular shaped trigger 28 by means of a pivoted link 29. The upper portion of trigger 28 is pivoted on a pin 30 carried by bracket 21 and the upper edge of trigger 28 is provided with a downwardly inclined lip 31 under which the free end of trip arm 19 is engaged.

A piston rod 32 is pivoted at one end to the arm 18 and is provided with a piston 33 working in a cylinder 34 secured to a bracket 35 which pivots on a pin 35a extending from one of the side walls 6. The outer end of cylinder 34 is provided with a vent 36 having a regulating screw 37 and apertures 36a are provided in the inner end of the cylinder.

A fin 38 is secured at one edge to shaft 12 by bolts and nuts 38a or other suitable fastening means for rotation by the shaft in housing 5, the fin having wings 39 at each side edge swinging across entrance openings 6 to close the entrances during initial rotary movement of the fin.

A scraper blade 41 is suitably secured adjacent one end to a rod 42 which has its ends pivoted in the ends of cover 9 for vertical swinging movement of the free end of the scraper, the pivoted end of the scraper being positioned immediately above a trap door 43 also pivoted for vertical swinging movement adjacent the lower edge of cover 9 by means of a rod 44, the trap door being normally held in a raised position by means of a coil spring 45 carried by rod 44 and the trap door is limited in its raising movement by means of a lip 46 on the lower edge of cover 9 to normally hold the trap door in a substantially horizontal position as shown in Figure 4 of the drawings. The trap door 43 is positioned above the portion of the tank 10 which projects under the cover.

A bait holder 47 is suitably secured to base 7 adjacent the pivoted end of treadle 24, the top of the bait holder being closed by a screen 48.

The tank 10 is held in position on the base 7 by the lower edge of cover 9 which projects downwardly into the open top of the inwardly projecting edge of the tank and the cover 9 is removed by means of interfitting channel-shaped guides 49 carried by the ends of housing 5 and slides 50 carried by the cover 9 and the ends of the cover are provided with finger grips 51 for sliding the cover vertically to remove the same from the housing.

In the operation of the device the shaft 12 and fin 38 are rotated by spring 13 in the direction as shown by the arrow of Figure 4 of the drawings and the fin is normally held in the position as shown in Figure 4 by the arm 17 engaged under catch 22 at the pivoted end of trip 19 which has its free end held under lip 31 of trigger 28.

In this position the scraper is held in an inclined position by fin 38.

An animal entering one of the openings 6 will move trip treadle 24 downwardly to rock trigger 28 in a direction to release lip 31 from trip arm 19 whereupon the spring actuated shaft 12 will swing arm 17 upwardly free of catch 22 and swing fin 38 downwardly to sweep the animal upwardly as shown by the dotted lines in Figure 4 into the cover 9 and onto trap door 43 which deposits the animal into tank 10.

As the fin 38 swings downwardly during its initial movement, the free end of scraper 41 drops onto shaft 12 and rests thereon or on the exposed ends of bolts and nuts 38a until the fin reaches its upwardly moving position carrying the animal with it. The scraper then rides on the surface of the fin to remove the animal from the fin and the scraper is then raised by the fin to slide the animal onto trap door 43. The raising of scraper 41 cuts off the possibility of the animal returning to housing 5. When the trap is in its set position, as shown in Figure 4, only a slight initial movement of shaft 12 is needed to move arm 18 past the center of the shaft.

Upon the initial downward movement of fin 38 the arm 18 attached to piston 33 of dash-pot 34 moves the piston outwardly, vent 36 being regulated to permit an unrestricted slight outward movement of piston 33 sufficiently to permit rapid initial rotation of fin 38 until arm 18 moves to such a position that the piston moves inwardly of cylinder 34 whereupon air will be partially compressed in the apertured inner end of the cylinder and suction will be created in the outer end of the cylinder to slow the travel of the piston and retard movement of the fin to a slow speed to enable return of trip arm 19 and trigger 28 to their resetting positions. The trip arm 19 and trigger 28 gravitate into their resetting positions and as arm 17 returns in its upward movement it is engaged under catch 22 to hold the fin in its set position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. An animal trap comprising a drum-like trap housing having an entrance thereto, a water tank, a trap door for the tank enclosed in the housing, a spring motor actuated shaft journalled in the housing, a fin projecting radially from the shaft for rotation in the housing to lift an animal, catch means holding the shaft stationary, animal actuated trip means for releasing the shaft, and a scraper pivotally supported in the housing with a free edge adapted to rest on the fin during its upward movement to remove the animal from the fin onto the trap door.

2. An animal trap comprising a drum-like trap housing having an entrance thereto, a water tank, a trap door for the tank enclosed in the housing, a spring motor actuated shaft journalled in the housing, a fin projecting radially from the shaft for rotation in the housing to lift an animal, catch means holding the shaft stationary, animal actuated trip means for releasing the catch, and a scraper pivotally supported in the housing and normally held in an upwardly inclined position by the fin, said scraper being adapted to gravitate to rest its free edge on the fin during upward movement of the fin to remove the animal therefrom onto the trap door.

3. An animal trap comprising a drum-like trap housing having an entrance thereto, a water tank, a trap door for the tank enclosed in the housing, a spring motor actuated shaft journalled in the housing, a fin projecting radially from the shaft for rotation in the housing to lift an animal, catch means adapted to hold the shaft stationary, animal actuated trip means for releasing the catch, automatic resetting means for the catch means, a closure for the entrance carried by the fin for movement thereby into a temporary closed position upon initial movement of the fin, and animal transfer means actuated by the fin for removing the animal from the fin onto the trap door.

4. An animal trap comprising a drum-like trap housing having an entrance thereto, a water tank, a trap door for the tank enclosed in the housing, a spring motor actuated shaft journalled in the housing, a fin projecting radially from the shaft for rotation in the housing to lift an animal, catch means adapted to hold the shaft stationary, animal actuated trip means for releasing the catch, automatic resetting means for the catch means, a closure for the entrance carried by the fin for movement thereby into a temporary closed position upon initial movement of the fin, animal transfer means actuated by the fin for removing the animal from the fin onto the trap door and arresting means for the fin operatively connected to the shaft to retard rotation thereof as the fin approaches its reset position.

AUSTIN E. KNESS.

REFERENCES CITED

The following references are of record in the file of this patent:

UNITED STATES PATENTS

| Number | Name | Date |
|---|---|---|
| 136,995 | Hebb | Mar. 18, 1873 |
| 1,213,997 | Arrioja | Jan. 30, 1917 |
| 1,440,901 | Barwicki | Jan. 2, 1923 |